Figure 1:
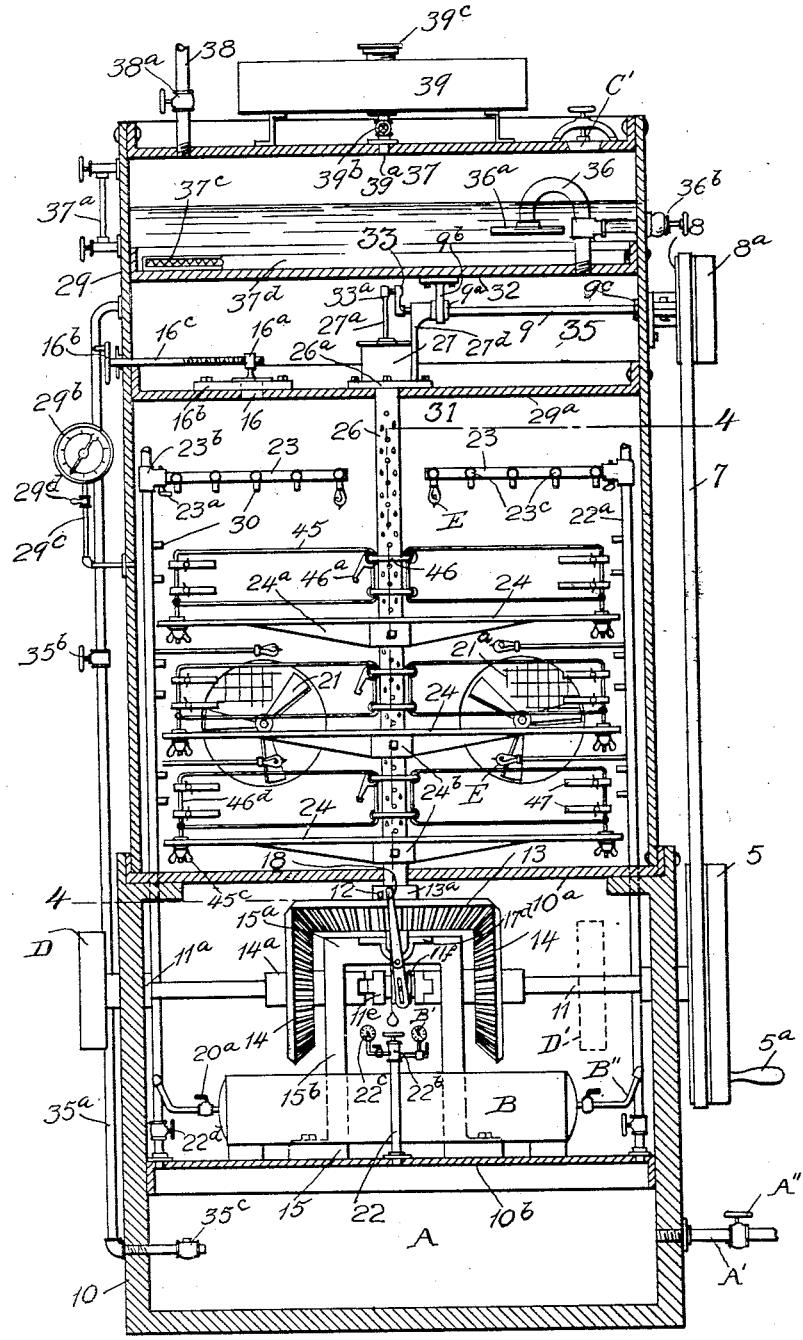

S. J. FISHER & C. E. J. JONES.
APPARATUS FOR DISINFECTING BOOKS.
APPLICATION FILED MAR. 11, 1912.

1,122,714.

Patented Dec. 29, 1914.

3 SHEETS—SHEET 1.

Witnesses:

Inventors

S. J. FISHER & C. E. J. JONES.
APPARATUS FOR DISINFECTING BOOKS.
APPLICATION FILED MAR. 11, 1912.

1,122,714.

Patented Dec. 29, 1914.
3 SHEETS—SHEET 2.

S. J. FISHER & C. E. J. JONES.
APPARATUS FOR DISINFECTING BOOKS.
APPLICATION FILED MAR. 11, 1912.
1,122,714.
Patented Dec. 29, 1914.
3 SHEETS—SHEET 3.
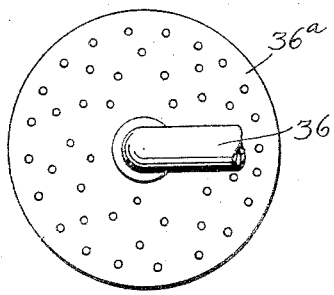
Fig. 5.
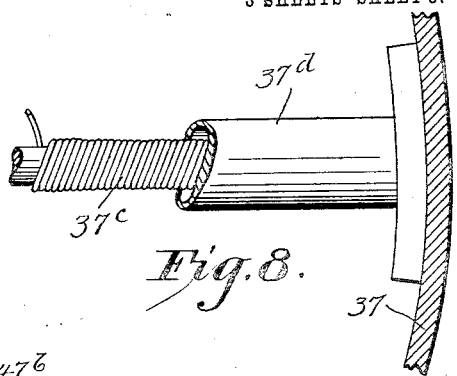
Fig. 8.
Fig. 6.
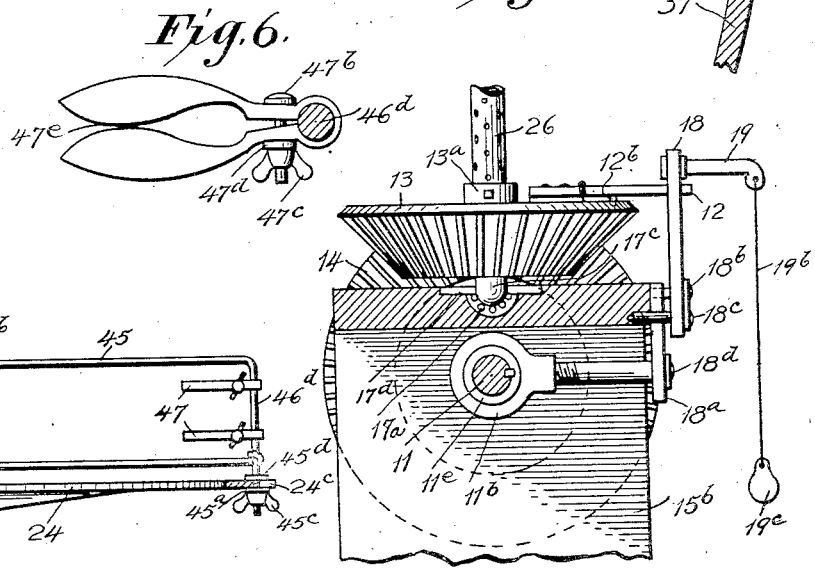
Fig. 3.
Fig. 7.
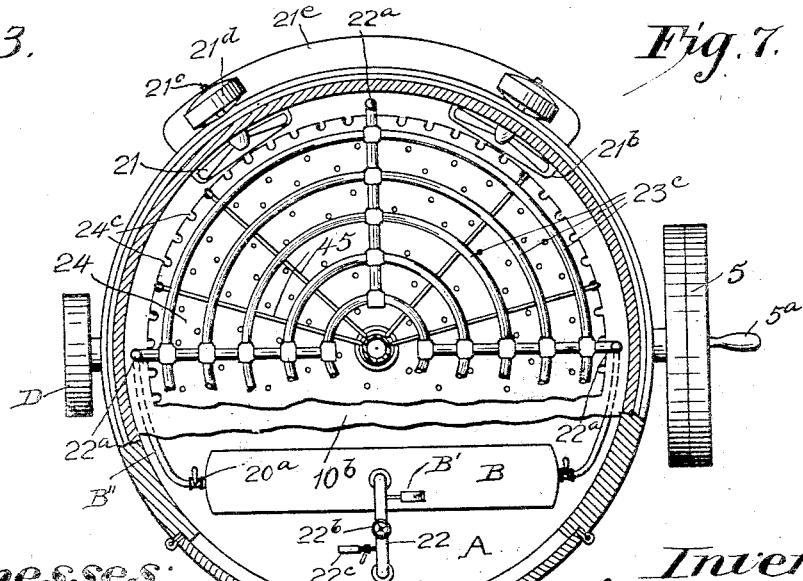
Fig. 4.
Witnesses:
Inventors
Samuel James Fisher
Charles Earl Johnson Jones

UNITED STATES PATENT OFFICE.

SAMUEL JAMES FISHER AND CHARLES EARL JOHNSON JONES, OF ASHEVILLE, NORTH CAROLINA.

APPARATUS FOR DISINFECTING BOOKS.

1,122,714.   Specification of Letters Patent.   Patented Dec. 29, 1914.

Application filed March 11, 1912. Serial No. 682,836.

*To all whom it may concern:*

Be it known that we, SAMUEL JAMES FISHER, a British subject, and residing at No. 287 Chestnut street, in the city of Asheville, in the county of Buncombe, and in the State of North Carolina, and CHARLES EARL JOHNSON JONES, a citizen of the United States of America, residing at No. 377 Montford avenue, in the said city of Asheville, county of Buncombe, and State of North Carolina, have invented a new and useful Apparatus for Disinfecting Books, of which the following is a specification.

Our invention relates to improvements in fumigating machines and is adapted especially for fumigating books by discharging germicidal gas within a chamber against the edges and between the leaves and interstices of the books to be disinfected, said books being secured in a suitable manner upon shelves adjustably mounted upon a revoluble standard within said chamber relative to nozzles and fans therein disposed in such manner as to blow a germicidal gas upon, into and between the leaves and interstices of the books.

The case housing the apparatus is preferably tubular and is divided into compartments separated from one another by division plates and is provided with valves and valve-controlled intakes and vents and also doors, the fumigating chamber being provided with air-tight doors and is adapted to receive the books to be disinfected and retain compressed gas and air without leakage.

Operative power may be supplied from any suitable source of energy.

A sterilizing tank is provided for the gases discharged after service, the gas being discharged beneath the surface of the fluid in the tank and forced to rise to the surface in small globules. There may be a plurality of such tanks though only one is illustrated and these tanks may be positioned without the case and the fluid heated in any convenient manner. These tanks may be lined with or constructed of any suitable material.

Gases discharged in the fumigating chamber may be exhausted into the supply tank and supply pipes and redischarged therein, and thus continuously returned into the fumigating chamber.

Suitable mechanism actuates the book-stand and any style of nozzle or gas tip may be employed. Likewise any style of rotary fan, blower, cage and shield may be utilized without departing from the spirit of this invention.

Our invention will more fully appear as the description proceeds and will be distinctly pointed out in the claims but it is evident that we do not restrict it to the precise form and style illustrated in the drawings but it may be embodied in other structures which substantially correspond with the claims inasmuch as the central feature of the invention is to present the books to be disinfected upon a revoluble supporting member in front of a plurality of nozzles or tips or vents discharging thereinto gas or air under pressure and revolving fans whose function is to blow the released gas or air into and between the leaves of the books to be treated.

Figure 2:
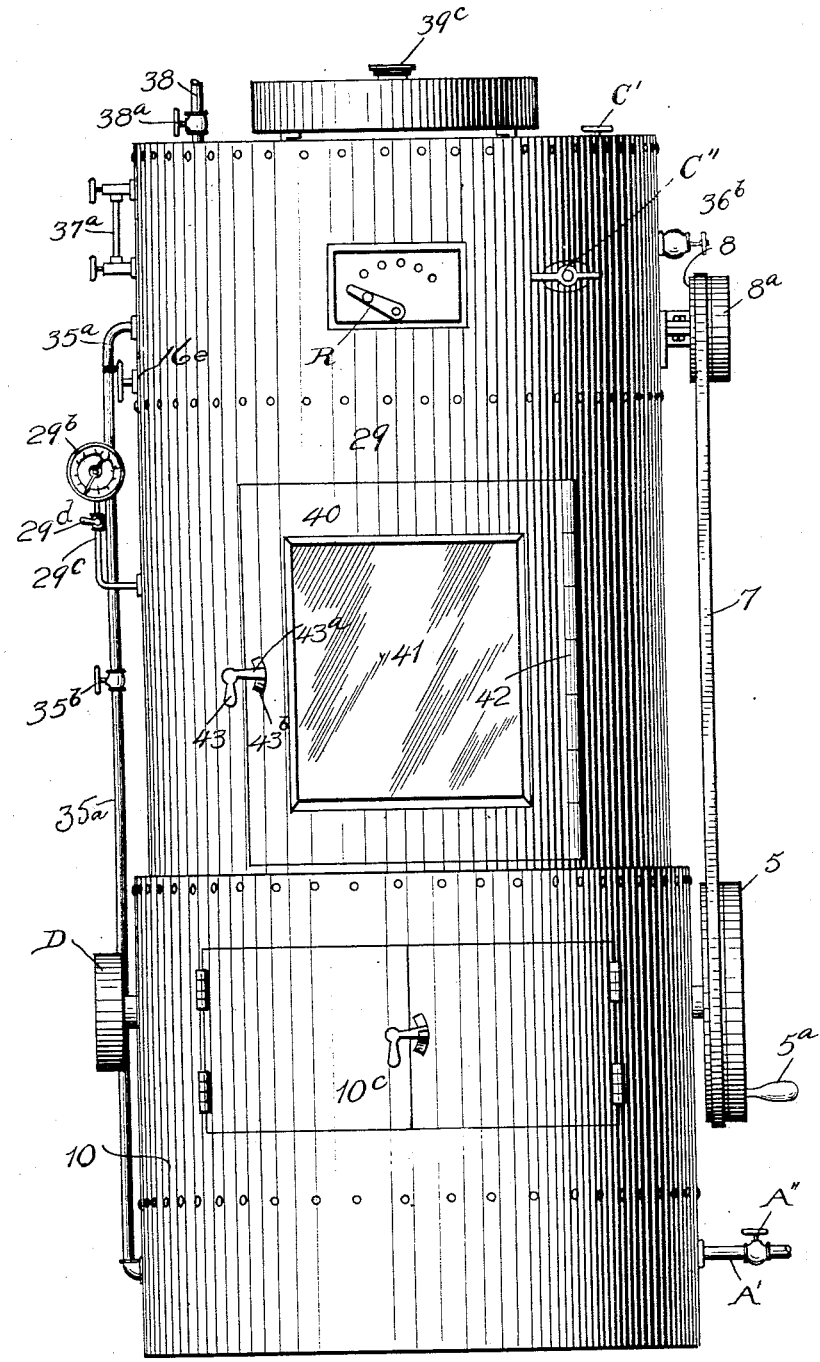

Figure 1 represents a vertical, cross-section of the apparatus. Fig. 2 represents a front elevation of the machine. Fig. 3 is a detail of book-holder attached to shelf and rings. Fig. 4 is a horizontal, cross-section of the apparatus, illustrating sections and views of various parts at different levels. Fig. 5 is a detail of plate in sterilizing tank. Fig. 6 is a detail of clip. Fig. 7 is a detail of standard base and driving members. Fig. 8 is a detail of the jacket to the heating apparatus in the sterilizing tank.

The apparatus is inclosed in a vertical, cylindrical case 29 which is secured to and rests upon a vertical drum-base 10. These are preferably of metal construction.

$10^a$ is the division plate which separates the drum-base 10 from the cylindrical case 29 and $10^b$ is the division plate between the air tank at the bottom of the drum-base and the operating chamber in said drum base arranged immediately above it. $10^c$ is the door to said operating chamber in the drum-base.

A is the air-tank adapted to chamber compressed air and it receives its supply by a service pipe A′ with cut-off valve A″. A plurality of pipes tap the air-tank A. All of these pipes are fitted with suitable valves to shut off and control flow of air. The pipe 22, fitted with a check valve $22^b$ connects the air-tank A with a portable gas-tank B. Pressure gages are fitted to said pipe 22 fore and aft said check valve.

22ᵃ are the air pipes leading from the air-tank A to the fumigating chamber 31. These air pipes are adapted to discharge air or gas as desired and for that purpose they are connected to the cocks 20ᵃ at either end of the portable tank B by branch pipes B″. Intermediate the air tank A and the T joints connecting the pipes 22ᵃ with the gas tank B are the valves 22ᵈ. These valves are so arranged that either air or gas or both may be discharged through the pipes 22ᵃ as desired. The pipes 22ᵃ pass through the division plates 10ᵃ and 10ᵇ and proceed vertically into the fumigating chamber 31 above the drum-base 10 where they are provided with horizontal extensions 23. The pipes 23 converge toward the standard 26. They connect with the pipes 22ᵃ by T joints or elbows.

A plurality of air-spray nozzles 30 are laterally disposed upon the pipes 22ᵃ and are dependent from the pipes 23 within the fumigating chamber 31. These nozzles are adjustable and may be regulated by a small valve or cock in said nozzles. They are so disposed upon the pipes as to vent their contents upon and between the edges and leaves of the books secured to the book holders or book racks or supports 45 by the clamps or book-clips 47 which are vertically adjustable upon the upright members of said book racks.

The books to be disinfected are preferably positioned upon the book shelves 24 with their edges adjacent the rim of the shelf. Thus they are disposed in an upright position with their backs adjacent the standard and their board edges secured by the clips 47 and their boards clamped between the jaws of the clips.

The pipes 23 are horizontal extensions of the pipes 22ᵃ and they converge toward the standard 26. They are closed at their ends and are fitted with lateral, spaced curvilinear extension pipes 23ᶜ as shown in Fig. 4. The pipes 23ᶜ are supported by the pipes 23 and are concentric. The pipes 23ᶜ are fitted with dependent vents or nozzles and they receive their supply of gas at their termini from the pipes 23 with which they unite.

23ᵃ are the valves or cocks which shut off the supply of gas or air from the pipes 23 and 23ᶜ. They are fitted to the T joints 23ᵇ or the pipes 23ᶜ.

The book-shelves 24 are disk-plates preferably perforated and constructed of metal. These shelves, however, while disk shaped may be segmented and assembled upon their supports in any suitable or convenient manner and they are fitted with a central aperture or core corresponding with the periphery of the standard. These shelves are supported by radial brackets or arms 24ᵃ which radiate from a collar or hub 24ᵇ and this hub is collared to the standard by bolts or set screws. These radial brackets 24ᵃ are preferably flat on top and the shelving is secured to them by screws or bolts or in any suitable manner. Thus every shelf is secured to a plurality of radial brackets and is supported by and secured to a central standard in an adjustable manner, the collar or hub being adjustable upon the standard 26 by means of the bolts or setscrews which secure it thereto.

The shelves 24 are provided with dentated rims 24ᶜ so constructed as to permit the vertical members 46ᵈ of the bookracks 45 to be inserted into the indentations and secured upon the shelf 24 in an adjustable manner by the thumbscrew 45ᶜ and the nut 45ᵈ and the washer 45ᵃ, the said vertical member 46ᵈ being threaded to receive said nut and screw.

45 represents a bookrack, a plurality of which are adjustably secured to the shelves 24 in a radial manner so as to form upright partitions of variable extent. These bookracks are preferably constructed of wires so as to form a frame with one upright next the rim of the shelf and parallel to the standard and the other next the standard and parallel thereto. The frame of the bookrack may be constructed of a single wire looped to a plurality of rings encircling or surrounding the standard and is substantially rectangular. These bookracks may be covered with wire net or braced with rods.

46 are the rings encircling the standard and 46ᵇ are the wire loops formed by the wire of the frame 45 in passing around the body of the rings.

47 are the book clips secured to the upright 46ᵈ of the rack 45. These clips are preferably of spring metal with recurved jaws, 47ᵉ. They are secured to the vertical member 46ᵈ by a bolt 47ᵇ, a washer 47ᵈ and a thumbscrew 47ᶜ which constrict the sides of the clip so as to bind it to the vertical rod 46ᵈ, the bow of the clip being saddled to the rod. By turning the thumbscrew the clip is adjusted along the rod so as to position the clip as desired.

The eccentric clamp 46ᵃ is attached to the rings 46 in any suitable manner and is provided with a handle which gives it leverage by means of a cam contacting with the side of the standard.

The standard 26 is preferably a perforated, metal pipe vertically disposed within the case 29 and is journaled in bearings equidistant from the walls of the case. It extends above and below the division plates of the fumigating chamber 31 and is seated within a ball and socket bearing 17 as shown in Fig. 7 and it is provided with a circular keyway near the top where it is connected with a pneumatic pump 27, which may be of any desired style or construction, said pump being seated on a collar 26ᵃ, as shown in Fig. 1. Thus the pump is secured to the collar so as to exhaust the contents of the fumigating chamber 31. The collar 26ª being fast with the division plate 29ª and the standard 26 being perforated, forming a flue for said chamber 31, the gases and air liberated in said chamber pass through said perforations and into the pump 27 when the vent 16 is closed and said pump in operation.

27 as shown is a cylinder pump with a valve so arranged as to exhaust the contents of the chamber 31 through the flue of the pipe-standard 26. The plunger of this pump is operated by a pitman 27ª which is actuated by a crank-pin 33ª and a crank 33 in the manner illustrated. The crank 33 is mounted on a horizontal shaft 9 in the chamber 35, as shown in Fig. 1, the shaft 9 being journaled near its extremities by the hanger bracket 9ᵇ and the upright bracket 27ᵈ and a bearing let into the wall of the case 29 and secured thereto. The upright bracket 27ᵈ is secured to the pump-base and the shaft 9 is driven by means of a pulley 8 which is mounted on said shaft without the walls of the case 29.

The hanger bracket 9ᵇ is fitted with a suitable bearing 9ª for journaling the shaft 9 and it is attached to the division plate 32. 9ᶜ represents the bearing in the wall of the case 29 and fast with same.

Bolted to the division plate 10ᵇ within the drum-base 10 there is a bridge-bracket 15 with a horizontal span 15ª. A cup socket 17ᵇ is let into the center of this span.

17ᵈ is a washer countersunk in the center of the span 15ª. The diameter of the washer exceeds the diameter of the cup-socket but the diameter of its core is smaller than the diameter of the cup.

17ª represents a plurality of steel balls of equal size and sufficient in number to form a proper bearing for the spherical butt of the plug 17ᶜ which is inserted in the lower end of the standard 26. Thus the standard 26 is rotatably seated in a ball bearing.

13 is a beveled gear with hub 13ª by means of which it is keyed to the standard 26, as shown in Fig. 7.

14 represents each of two vertical, beveled gears disposed upon a horizontal drive shaft 11, Fig. 1. These gears mesh with the gear 13 and are mounted on the axle-sleeves 14ª which are journaled in the piers 15ᵇ of the bridge-bracket 15. These sleeve axles work loose upon the shaft 11 but are incapable of longitudinal motion, the shaft 11 being encircled by grooves to receive studs threaded into perforations in said sleeves. Intermediate the piers 15ᵇ and serrated rims of the axle-sleeves 14ª is a sliding double-clutch 11ᵉ arranged to mesh alternately with the teeth in the rims of the sleeve-axles 14ª. This clutch is feathered to the shaft 11 and is girdled by a collar 11ᶠ which runs in a groove encircling the clutch. To this collar is attached a bolt 18ᵈ which plays in a slot inserted in the lower member 18ª of the shift bar 18, the bolthead overlapping the slot. 18ª is bolted to 18 which is pivoted and secured by a second bolt to the span of the bridge-bracket 15. 18ᵇ is the bolt securing 18ª to 18 and 18ᶜ is the pivot-bolt or axis of the shift bar 18. Thus when the striker bar 12 hinged to the table or web of the gear 13 and projecting above and beyond its rim strikes the shift bar 18 as the gear revolves the sliding double-clutch 11ᵉ meshes alternately with the teeth in the rims of the sleeve-axles.

A stud 12ᵇ projecting from the striker bar 12 fits into an aperture or perforation in the table of the gear 13 when the striker is in commission. When in commission the striker bar oscillates the standard 26 by reversing the gear 13 alternately as it strikes the shift bar 18. When out of commission a simple rotary motion is imparted to the standard 26.

19 is a bolt secured by locknuts to the shift bar at its top; the shift bar being perforated to receive it. This bolt is horizontal and projects clear of the bridge bracket. It is flattened at its end farthest from the shift-bar and perforated in order to suspend a bob or plummet 19ᶜ which depends from a line 19ᵇ. Thus when the striker bar 12 engages the shift bar 18 the plummet 19ᶜ swings to the gravital line and assists the shifting of the clutch 11ᵉ.

The shaft 11 is journaled in the bearings 11ª which are made fast with the walls of the drum base. Without the base this shaft mounts two pulleys D and 5. When the shaft is belted to a motor within the drum base a pulley D' is mounted on it within the drum base as shown in dotted lines. The pulley 5 is provided with a handle 5ª and may be used as a crank-wheel when so desired. This handle is removed when the shaft is belted to a motor or engine without the case. 7 is a belt which connects the pulleys 5 and 8. 8ª is a loose or slack pulley on the shaft 9. Thus the pump is put out of commission by the use of a belt shifter without interfering with the operation of the standard 26.

21 represents the rotary fans disposed on shafts journaled in bearings made fast with the walls of the case 29 and disposed in such manner that the fans are within the fumigating chamber positioned opposite the shelves and facing the standard while their motors 21ᵈ are secured to a shelf or brackets 21ᵉ supported by the outer walls of the case 29. These motors may be electric or spring motors or may be replaced by pulleys or sprockets. The style and kind of motor is deemed immaterial. The shaft 21ᶜ of these fans extends without the case 29 and is driven by motor, pulley or sprocket as desired. The fans 21 are designed to blow air or gases previously liberated, in the fumigating chamber 31 into the crevices between the leaves and boards of the book and between the leaves when the supply is cut off. They are provided with suitable drum-shaped guards or cages, 21$^a$, to the band of which are secured suitable shields 21$^b$. These fans may be arranged and constructed in any suitable manner no claim being made for the style of fan, guard, shield or motor employed.

A plurality of electric lights E are arranged within the fumigating chamber in any suitable manner.

16 is the vent in the division plate 29$^a$ to the fumigating chamber 31. It is opened and closed by a sliding valve 16$^a$, which is operated by a feeding device 16$^b$. This valve is fitted into a channeled casing 16$^d$ and is integral with a vertical member which is perforated to receive the threaded rod of the feeding device. This feeding device comprises a threaded rod 16$^c$ which is journaled in the bearing integral with the walls of the case 29 so as to prevent air-leakage.

35 is the compartment which chambers the pneumatic pump 27 and immediately above it is the de-odorizing and sterilizing tank 37. The tank 37 is arranged to contain liquid and chemicals in solution and is provided with a water gage 37$^a$ which is mounted without the case 29.

36 is a gooseneck pipe connecting the chambers 35 and 37. It terminates in a perforated plate or drum 36$^a$ and is provided with a valve 36$^b$ as shown in Fig. 1. The purpose of this construction is to discharge the gases and air laden with germs beneath a perforated plate or within a perforated drum or rose nozzle and force them to rise to the surface in tiny globules. This tank 37 may be separated from the case or integral with it and it may be lined with any suitable material.

38 is the vent pipe to the case 29 and the tank 37 and it is provided with a valve 38$^a$.

39 is the chemical supply tank superposed upon the apparatus and connecting with the tank 37 by a pipe 39$^a$ which is preferably fitted with a suitable valve 39$^b$. This tank is provided with a neck and cap 39$^c$, the cap being threaded to the neck.

C' is a handhole to the tank 37 and C'' is a handhole to the chamber 35.

29$^b$ is the pressure gage connected with the fumigating chamber 31 by means of a pipe and cock, 29$^c$ and 29$^d$ respectively.

The gage to the gas tank B is fitted to the pipe 22 intermediate the valve 22$^b$ and the tank B and is represented by B'.

22$^e$ is the pressure gage intermediate the valve 22$^b$ and the tank A.

The object of the gage B' is to determine the pressure of gas in the tank B and the object of the gage 22$^e$ is to determine the pressure of the air in the tank A.

40 represents the door to the operating chamber 31 wherein the books are deposited upon the shelves for fumigation.

41 is a heavy, plate glass window in the door 40 to demonstrate to the operator the efficiency of the machine.

42 is the piano hinge which swings the door 40 and secures it to the jamb of the door.

43 is the lever which locks the door 40 by rotating a bolt 43$^a$ against a plate 43$^b$. This plate is integral with the door and is so constructed that the bolt presses the door farther in as the bolt advances its contact with the plate and thus compresses the elastic lining to the stops, jambs and edges of the door and so makes the door air-tight and effects an air-proof closure. This door is curved to correspond with the surface of the case and its edges are rabbeted into rectangular recesses like a safe door to correspond with the rabbets in the stop. These rabbeted edges of the door and the recesses in the stop and the jambs are covered with rubber, felt or some pliant and elastic material to render the closure air-proof under pressure from the bolt and to prevent leakage of gas from within the case. Inasmuch as no gas is liberated in the base drum its door 10$^c$ need not be so constructed.

Suitable stuffing boxes or stuffing glands with grease cups are provided for the bearings in the division plate 10$^a$ and the walls of the case 29.

The motors 21$^d$ may be inclosed in airtight metal boxes integral with the case 29 and supported by and made fast to the outer wall of said case.

An electric heater of any suitable make, style or design, 37$^c$, and preferably inclosed in a water-proof casing 37$^d$ is installed in the tank 37 for heating the liquid contents of the tank to the boiling point, thus when the gas is discharged at the bottom of this tank it is forced to rise to the surface of the boiling water in small globules and pass with the escaping steam through the final vent pipe 38. This is an alternative method for sterilizing the escaping gas and air.

Another alternative method may be employed for fumigating the books within the chamber 31. This need not be an alternative operation for it may be employed with the rotary fans, which are designed to blow the gas after its discharge into the faces and leaves of the books and between the pages. In order to effect economy of gas during operation the chamber 35 may be connected with the tank A by a pipe 35$^a$ with an intermediate valve 35$^b$ and a check valve 35$^c$ within the tank A. By closing the valve 36$^b$ the chamber 35 becomes an air tight drum unless the valve 16 is opened between the chambers 31 and 35 or unless the valve 35$^b$ is opened to afford connection between the tank A and the chamber 35. Now it is apparent that by closing the valves 36$^b$ and 16 the pump 27 discharges its contents drawn from the chamber 31 into the chamber 35.

By closing the valves to the gas tank B and the valve A″ in the supply pipe and opening the valves 22$^a$ in the pipes 22$^a$ connecting the tank A with the chamber 31 the pressure of air or gas in the tank A and the chamber 31 is equalized. Therefore when the chamber 35 is connected with the tank A under these conditions a circulation of gas from the chamber 35 to the tank A and thence from the tank A through the pipes 22$^a$ and their nozzles 30 back again into the chamber 31 is produced, the pump 27 operating to produce such circulation of gas or air, for it exhausts the contents of the chamber 31 into the chamber 35 and makes the gas pressure in the chamber 35 greater than that in either the chamber 31 or the tank A and this gas naturally seeks an outlet by the ordinary process of expansion through the pipe 35$^a$ into the tank A and thence through the pipes 22$^a$ and the nozzles 30 into the chamber 31 where there is a comparative vacuum or a chamber whose air density is considerably inferior to that in the chamber 35. In this manner we may circulate the gas and produce a constant discharge of gas through the nozzles 30 onto the faces, edges and between the pages of the books positioned upright on the shelves 24 and secured to the holders or racks 45. As it will be necessary to expose the germs in the books to the effect of the germicidal gases for a period of time before they can be destroyed and as its will be necessary to keep the volumes open so that all portions of every volume may be continuously exposed to the effect of the gas during this period the value of this alternative method becomes apparent. Still it is not necessary to discontinue the use of the rotary fans while this alternative method is being employed. While this method is alternative it must be in effect supplementary to the discharge of the gases from the tanks A and B into the chamber 31 for until a requisite quantity of gas from these tanks is introduced into the chamber 31 the alternative method of circulating such gas cannot be employed.

When electrical energy is employed for operating the apparatus, a switch or rheostat R is secured to the outer wall of the casing as shown in Fig. 2. This switch or rheostat may be of any desired type or manufacture.

Having thus described our invention what we claim is:—

1. In an apparatus for disinfecting books, a plurality of horizontal circular shelves mounted within a compartment adapted to receive books and hold compressed gas without leakage, upon a revoluble standard in said compartment and means to actuate said standard.

2. An apparatus for disinfecting books, comprising a case with compartments one of which is adapted to receive books and hold compressed gas without leakage, a revoluble standard with a plurality of circular shelves mounted at spaced intervals thereon in said compartment adapted to receive books and means for adjusting said shelves thereupon.

3. An apparatus for disinfecting books, comprising a case with a compartment adapted to receive books and hold compressed gas without leakage, a revoluble bookstand with adjustable shelves and bookracks secured thereto in said compartment in an adjustable manner and means for actuating said bookstand.

4. An apparatus for disinfecting books, comprising a case with a compartment adapted to receive books and hold compressed gas without leakage, a plurality of book shelves with detachable book-racks secured thereto in said compartment and means for supplying said compartment with gas under pressure, a valve-controlled outlet to said compartment and means to adjust the bookracks relative to the size of the books to be disinfected.

5. An apparatus for disinfecting books, comprising a case with a compartment adapted to receive books and hold compressed gas without leakage, a plurality of bookshelves revolubly mounted in said compartment and a plurality of nozzles disposed upon pipes in said compartment and connected with a plurality of pressure supply tanks arranged with valves to discharge gas and air under pressure.

6. In an apparatus for disinfecting books, the combination of a valve-vented compartment adapted to receive books and compressed gas, with a revoluble bookstand therein vertically arranged and means to actuate the same rotatably, adjustable, circular bookshelves disposed in said bookstand, means to secure books upon said shelves in an upright position with their open edges next to the perimeters of said shelves, means to discharge gas under pressure between the open edges of said books so arranged, said means consisting of a plurality of feed pipes in said compartment arranged opposite to said revoluble bookstand, perforations laterally disposed on said feed pipes opposite to and adjacent said bookstand, valves to control the flow of gas through said pipes, a plurality of pressure-supply tanks attached to said pipes, means to supply said tanks with gas under pressure.

7. An apparatus for disinfecting books, comprising a case with a compartment adapted to receive books and hold compressed gas without leakage, the combination of a plurality of circular shelves adjustably mounted upon a revoluble standard in said compartment and a plurality of detachable book-racks secured to said shelves and said standard and radially adjustable upon said shelves relative to the size of the books to be secured to said racks by adjustable members.

8. An apparatus for disinfecting books, comprising a case with a compartment adapted to receive books and hold compressed gas without leakage, the combination of a plurality of circular shelves adjustably mounted upon a revoluble standard within said compartment and a plurality of nozzle-vented pipes in said compartment and arranged vertically and opposite to the said shelves with a plurality of reservoirs with valves adapted to receive and discharge gas or air under pressure into said pipes and means to actuate said standard.

9. An apparatus for disinfecting books, comprising a case with a compartment adapted to receive books and hold compressed gas without leakage and a perforated, tubular standard mounting a plurality of circular shelves secured thereto in an adjustable manner.

10. An apparatus for disinfecting books, comprising a valve-vented case with compartments, one of which is adapted to receive books and compressed gas, a perforated, tubular standard vertically disposed in said compartment adapted to receive books and therein revolubly mounted, means to actuate said standard rotatably, means to vent said compartment adapted to receive books through the perforations in said revoluble standard and vertically adjustable bookshelves mounted upon said standard.

11. An apparatus for disinfecting books, comprising a case with a compartment adapted to receive books and hold compressed gas without leakage, a tubular standard revolubly mounted upon a ball bearing with means for driving said standard rotatably in a reverse or direct manner and a plurality of circular shelves secured thereto in an adjustable manner.

12. An apparatus for disinfecting books, comprising a case with a compartment adapted to receive books and hold compressed gas without leakage, a perforated, tubular standard revolubly mounted in said compartment, a plurality of circular shelves secured thereto in an adjustable manner with book-racks attached, means for rotating said standard in direct and reverse order and an exhaust pump arranged within the case to exhaust the gases from said compartment through the said perforated standard.

13. An apparatus for disinfecting books, comprising a case containing a compartment adapted to receive books and hold compressed gas without leakage, a perforated, tubular standard revolubly mounted within said case, a plurality of circular shelves with detachable book-racks secured to said standard in an adjustable manner, means for rotating said standard in either direction and means for exhausting the gases discharged in said compartment through a vent in said tubular standard.

14. In an apparatus for disinfecting books, comprising a case containing a compartment adapted to receive books and hold compressed gas without leakage, the combination of a tubular, perforated, revoluble standard mounting a plurality of shelves adjustable thereon within said compartment and means for rotating said standard in either direction within said case and exhausting the gases from said compartment through the said standard.

15. An apparatus for disinfecting books, comprising a case with compartments, one of which is a disinfecting chamber adapted to receive books and hold compressed gas without leakage, in combination with a revoluble bookstand within said disinfecting chamber and means to actuate said bookstand and means to supply said chamber with gas under pressure, said means consisting of a plurality of upright supply pipes with horizontal pipe extensions arranged in said chamber, vent holes disposed along said pipes and a source of supply connected with said pipes, valves to said pipes, a valve controlled outlet to said chamber and means to open the leaves of the books when disposed on said bookstand with their open edges next the rims of the shelves to said bookstand, said means consisting of rotary fans arranged in said chamber adjacent the shelves of said bookstand and means to actuate the same and nozzle vents to said pipes arranged in said chamber adjacent the shelves of said bookstand.

16. An apparatus for disinfecting books, comprising a case with compartments, one of which is a disinfecting chamber adapted to receive books and hold compressed gas, in combination with a valve-controlled outlet to said chamber, valve-controlled inlets to said chamber, a revoluble bookstand within said chamber and means to actuate the same and a plurality of rotary fans disposed in said chamber adjacent the shelves of said bookstand and the spaces intervening said shelves and means to actuate said fans.

17. In an apparatus for disinfecting books, the combination of a case with compartments, one of which is a disinfecting chamber adapted to receive books and hold compressed gas with a revoluble bookstand within said chamber, said bookstand having adjustable shelves and bookracks radially adjustable on said shelves, means to actuate said bookstand, adjustable clips to secure the books in an upright position on said shelves of said bookstand with open edges next the rims of said shelves, a valve-controlled outlet to said chamber, valve controlled supply-pipes to said chamber, operable means to return the gas released from said chamber into the supply pipes to said chamber and operable means to force the gas supplied to said chamber between the leaves of the books to be secured upon the shelves of said bookstand, said means consisting of a plurality of rotary fans disposed in said chamber opposite said bookstand and means to rotatably actuate said fans.

18. An apparatus for disinfecting books, comprising a valve-vented case with compartments, one of which is a disinfecting chamber with a valve-controlled outlet thereto, and a plurality of nozzle-vented, valve-controlled supply pipes leading into and arranged within said chamber adjacent to a revoluble bookstand therein, said bookstand and means to actuate the same, means to adjust the shelves of said bookstand to the size of the books to be deposited on said shelves, means to supply said pipes with gas and air under pressure and an exhaust pump operable to withdraw the gases supplied through said pipes to said chamber and force the gases so exhausted therefrom into a pressure supply tank connected with said pipes, said pressure supply tank and the valves connecting the same with said pipes.

19. An apparatus for disinfecting books, comprising a valve-vented case with compartments, one of which is a valve-vented, disinfecting chamber adapted to receive books and hold compressed gas and a revoluble bookstand arranged in said chamber and means to actuate the same, vertically adjustable shelves to said bookstand, radially adjustable bookracks detachably secured to said shelves and disposed thereon in an upright position, detachable book-clips adjustably secured to the upright members of said bookracks nearest the rims of said shelves, a plurality of vertical pipes leading into and arranged within said chamber and a plurality of apertures laterally arranged in said pipes on the sides of said pipes nearest said bookstand, means to control the flow of air from said apertures, means to supply said pipes with gas and air under pressure and means to regulate the flow of air and gas from the source of supply provided for said pipes.

20. An apparatus for disinfecting books, comprising a valve-vented case with compartments, one of which is a disinfecting chamber adapted to receive books and hold compressed gas in combination with a revoluble bookstand disposed within said case and arranged within said disinfecting chamber, adjustable shelves to said bookstand and so arranged and supported as to be adjustable vertically upon a central supporting member, adjustable partitions to said shelves, said partitions consisting of adjustable book supports detachably secured to said shelves, means to actuate said bookstand rotatably and reverse its order of rotation, a plurality of upright, nozzle-vented supply pipes arranged within said disinfecting chamber adjacent to said bookstand with the nozzles disposed next to said bookstand and opposite the spaces between its shelves, means to supply compressed gas and air to said pipes, valves to said pipes and an exhaust pump within said case and so arranged as to exhaust air and gas from said chamber into a compartment of said case adapted to hold gas and air under pressure and a valve-controlled pipe leading from said compartment and means to actuate said pump.

21. In an apparatus for disinfecting books, the combination of a valve-vented case with compartments, one of which is a disinfecting chamber adapted to receive books and hold compressed gas, and a plurality of perforated, circular bookshelves adjustably mounted upon a tubular, perforated standard within said chamber and arranged to revolve horizontally therewith, a driving gear attached to said standard and gear meshing therewith and mounted upon a revoluble shaft, means to rotate said shaft, means to alternate the rotation of said standard and an exhaust pump connected with said tubular standard and operable to exhaust gases from said disinfecting chamber through the perforations in said standard and means to supply said chamber with gas and air under pressure and the said standard.

22. An apparatus for disinfecting books, comprising a valve-vented case with horizontal compartments and doors to said case affording access to a compartment adapted to receive books and hold compressed gas, a standard revolubly mounted and supporting within said compartment a plurality of circular book-shelves adjustably secured thereto, a plurality of adjustable frames detachably secured to said shelves and radial to said standard, a plurality of book-clips adjustably attached to the said frames, a plurality of nozzles disposed adjacent to and opposite the spaces between said shelves and adapted to discharge gas, a plurality of pipes leading from a plurality of pressure-supply tanks into said chamber and vented through valves, a plurality of rotary fans arranged in said chamber adjacent to said shelves and operable means to exhaust the gas from said chamber through valves and means to sterilize the gases discharged from said chamber.

23. An apparatus for disinfecting books, comprising a valve-vented case with compartments, one of which is a disinfecting chamber adapted to receive books and hold compressed gas without leakage, a revoluble bookstand in said disinfecting chamber and means to discharge gas and air under pressure between the shelves of said bookstand, said means consisting of a plurality of supply pipes arranged vertically in said chamber opposite said bookstand and adjacent thereto and apertures in said pipes next the said bookstand and nozzles attached thereto, said pipes being fed in a suitable manner with gas and air under pressure, and valves to said pipes adapted to control and regulate the gas and air supplied to said pipes and operable means for releasing the gas supplied to said chamber and returning the same under pressure into said supply pipes.

24. In an apparatus for disinfecting books, a plurality of circular, perforated shelves with detachable book-holders adjustably secured thereto and mounted upon a revoluble standard within a chamber adapted to receive books and hold compressed gas without leakage, operable means for rotating said standard in either direction and exhausting the gases discharged therein, a plurality of perforated pipes parallel with said standard and disposed between the rims of said shelves and the walls of said chamber and means for supplying said chamber with germicidal gas or air under pressure and sterilizing the same after service.

25. In an apparatus for disinfecting books, the combination of a disinfecting chamber, adapted to receive books and hold compressed gas, with a revoluble bookstand within said chamber and a plurality of perforated supply-pipes therein adapted to discharge gas therein and between the shelves of said bookstand, means to supply said pipes with gas and air under pressure, means for exhausting gas from said chamber into a sterilizing tank arranged to contain liquid and for washing said exhausted gas in said tank, means for heating the liquid in said tank, said means comprising a source of heat within said tank and a vent pipe to said tank.

26. In an apparatus for disinfecting books, the combination of a disinfecting chamber, adapted to receive books and hold compressed gas, with a revoluble bookstand therein and a perforated, tubular standard to said bookstand and an exhaust pump connected with the terminus of said standard and adapted to exhaust gas from said chamber through the perforations in said tubular standard, perforated shelves to said bookstand and adjustable bookholders detachably secured thereto and adapted to support books with their open edges next the rims of said shelves, a plurality of perforated, perpendicular supply-pipes within said chamber and adapted to discharge gas between the shelves of said bookstand, means to supply said pipes with gas and air under pressure and valves to control the flow of gas and air in said pipes, a sterilizing tank arranged to contain liquid and means to discharge the air and gas exhausted from said chamber near the bottom of said tank and a jacketed, electric heater disposed within and near the bottom of said tank.

27. In an apparatus for disinfecting books, the combination of a disinfecting chamber, adapted to receive books and hold compressed gas, with a revoluble bookstand within said chamber and means to actuate the same rotatably and reverse its order of rotation, means to supply said chamber with gas and air under pressure and means to discharge the gas and air supplied to said chamber between the shelves of said bookstand, means to secure books upon the shelves of said bookstand with their open edges next the rim of the shelf, means to exhaust the gas and air supplied to said chamber and sterilize the same substantially as described.

28. In an apparatus for disinfecting books, the combination of a valve-vented case with compartments, one of which is a chamber adapted to receive books and hold compressed gas without leakage, with a plurality of circular, perforated bookshelves arranged to rotate within said chamber by means of power applied without said chamber to a standard supporting said shelves, adjustable bookholders detachably secured to said shelves and adapted to support books with their open edges erect and next to the rims of said shelves, means to supply said chamber with air and gas under pressure and means within said chamber to blow said gas and air between said shelves, a valve-controlled outlet to said chamber and a gooseneck pipe with a perforated nozzle arranged within said case and adapted to discharge the gas and air, released through said outlet to said chamber, into and near the bottom of a sterilizing tank arranged to hold liquid and a vent pipe to said tank.

29. In an apparatus for disinfecting books, the combination of a valve-vented case with compartments, one of which is a disinfecting chamber adapted to receive books and hold compressed gas, with a plurality of circular, perforated bookshelves arranged within said chamber to rotate in either direction therein by means of power applied without said chamber to a tubular, perforated standard supporting said shelves, an exhaust pump connected with said tubular standard and adapted to pump gas from said chamber into a sterilizing tank arranged to contain liquid, said tank and means within said tank to discharge gas pumped from said chamber into and near the bottom of said tank through a perforated member therein, a jacketed electric heater within said tank and adapted to heat its liquid contents and a vent pipe with valve, said pipe being attached to said tank and adapted to emit gas and vapor from said tank, and means to supply said tank with chemicals from a superposed, chemical supply tank and said chemical supply tank.

30. In an apparatus for disinfecting books, a valve-vented case with compartments, one of which is a disinfecting chamber adapted to receive books and hold compressed gas, an air tight door to said chamber and a transparent portion therein, electric lights within said chamber, a revoluble bookstand within said chamber and adjustable bookholders secured to the shelves of said bookstand, a plurality of perforated, supply pipes within said chamber and adapted to discharge gas and air between the shelves of said bookstand, means to supply said pipes from without said chamber with gas and air under pressure and a valve-controlled outlet to said chamber.

31. In an apparatus for disinfecting books, a valve-vented, disinfecting chamber adapted to receive books and hold compressed gas, an air-tight door to said chamber, electric lights within said chamber, a revoluble bookstand within said chamber and means to actuate the same, adjustable book-holders secured to and upon the shelves of said bookstand, means to open the leaves of books disposed on said bookstand with their open edges erect and next the rims of said shelves, said means consisting of rotary fans within said chamber and adjacent said bookstand, means for supplying said chamber with gas.

32. In an apparatus for disinfecting books, a cylindrical case with compartments, said case being disposed upon a drum base with an apparatus therein disposed adapted to rotably actuate a standard seated upon a ball-bearing, said standard, tanks arranged within said drum-base adapted to receive and chamber compressed air and gas without leakage and valves to said tanks, a plurality of adjustable book-shelves mounted on said standard within a compartment in said case adapted to receive books and hold compressed gas without leakage and pipes connecting said compartment with said tanks, a plurality of nozzle-vents disposed on said pipes adjacent to said shelves and operable means to vent said compartment.

33. An apparatus for disinfecting books, comprising a case with a compartment adapted to receive books and hold compressed gas, a vertical standard, revolubly mounted within said compartment, and a plurality of circular shelves adjustably disposed thereupon with dentated rims, the indentations of said rims being adapted to receive vertical members of book supports as described.

34. An apparatus for disinfecting books, comprising a case with a compartment adapted to receive books and hold compressed gas without leakage, a vertical, tubular, perforated standard revolubly mounted within said compartment and a plurality of circular shelves with dentated rims, the indentations in said rims being adapted to receive a plurality of vertical members adjustably secured to said shelves and arranged thereupon, said vertical members and a plurality of radial rods connecting each of said members with a plurality of rings encircling said standard and secured thereto in an adjustable manner and book-clips adjustably secured to each of said vertical members.

35. An apparatus for disinfecting books, comprising a case with compartments, one of which is adapted to receive books and hold compressed gas, a revoluble book stand within said compartment with detachable book-holders adjustably secured thereto and a plurality of clips detachably secured to said holders and so arranged upon vertical rods, extending upward from the outer edge of the shelving as to secure books deposited thereon in an upright position with their open edges next the rim of the shelves.

36. An apparatus for disinfecting books, comprising a case with a compartment adapted to receive books and compressed gas, a revoluble standard having mounted thereon a plurality of circular shelves with detachable book racks adjustably secured thereto in said chamber and radiating from rings encircling said standard to vertical members extending upward from the rims of said shelves with detachable book-clips adjustably secured to said members and a nut and thumb-screw securing each of said vertical members to the indented rim of one of said shelves and an eccentric clamp securing said rings adjustably to said standard.

37. In an apparatus for disinfecting books, the combination of a plurality of vertical book racks, radially disposed upon a circular shelf and detachably secured thereto in an adjustable manner by nuts and thumbscrews with a plurality of detachable clips adjustably secured to upright member of each rack extending upward from the dentated rim of the shelf by a nut and thumbscrew.

38. In an apparatus for disinfecting books, the combination of a vertical, perforated, tubular standard seated on a ball bearing with drive gear attached to said standard, and a plurality of disk shelves adjustably mounted thereon and disposed upon radial brackets converging in a collar girdling said standard and a plurality of frames extending radially from rings encircling said standard and detachably secured to said shelves upon which they are vertically disposed in an adjustable manner and a plurality of book-clips adjustable upon vertical members of said frames extending upward from the rims of said shelves.

39. In an apparatus for disinfecting books, the combination of a chamber adapted to receive books and hold compressed gas with a revoluble bookstand, therein vertically disposed, and a plurality of perforated, curved air-spray pipes, arranged within said chamber and adjacent to and above the shelves of said bookstand, and a plurality of valve-controlled feed pipes, connected with and supporting said air-spray pipes, and means to supply said feed pipes with air or gas under pressure.

40. In an apparatus for disinfecting books, the combination of a tubular, perforated, revoluble standard seated in a socketed ball bearing upon a bridge base with drive gear attached to said standard and meshing with gears selectively driven from a common shaft and an exhaust pump disposed above the top of said standard and adapted to exhaust gases from a chamber vented by said standard and means for operating said pump and driving said standard synchronously.

41. An apparatus for disinfecting books, comprising a cylindrical case with a compartment adapted to receive books and gas, the combination of a plurality of circular, book shelves adjustably mounted within said compartment upon a perforated, tubular standard with beveled drive-gear attached at its base and gears meshing therewith, said gears being selectively driven by an intermediate, sliding double clutch feathered to a drive shaft horizontally journaled in the walls of said case.

42. An apparatus for disinfecting books, comprising a cylindrical case with a compartment adapted to receive books and hold gas without leakage, the combination of a plurality of nozzle vented pipes arranged in said compartment, a plurality of revoluble shelves between said pipes and a plurality of connecting pressure tanks with valves adapted to regulate the discharge of compressed gas or air from any of said tanks into said pipes and a valve fitted to the pipe connecting said tanks with pressure gages fore and aft said valve.

43. An apparatus for disinfecting books, comprising a disinfecting chamber, adapted to receive books and hold compressed gas, valve-controlled outlets to said chamber, a revoluble bookstand within said chamber, perforated, circular, concentric pipes disposed between the shelves of said bookstand, horizontal pipes, radially arranged, connecting with and supporting said concentric pipes, perpendicular pipes within said chamber connecting with and supporting said horizontal pipes, valves to said perpendicular pipes and means to supply said perpendicular pipes with air and gas under pressure.

44. An apparatus for disinfecting books, comprising a case with compartments 31 and 35 adapted to hold compressed gas without leakage and with valve-controlled intakes and outlets, an exhaust pump 27 operable to discharge the gas from the chamber 31 into the chamber 35, a pipe 35$^a$ with valve 35$^b$ connecting the chamber 35 with the tank A, a check valve 35$^c$ to said pipe 35$^a$ in addition to said valve, a valve A'' controlling the supply pipe to the tank A, pipes 22$^a$ with nozzles 30 operable to discharge the contents of the tank A into the chamber 31 and a revoluble standard with adjustable bookshelves and holders disposed in said chamber 31, said shelves being arranged between the nozzles 30, means for rotating said standard and actuating said pump and air-tight doors to said chamber 31.

45. An apparatus for disinfecting books, comprising a case with a chamber adapted to receive books and hold compressed gas without leakage, a revoluble bookstand in said chamber, an exhaust pump operable to discharge the gases from said chamber under pressure through a return pipe with valve and check valve connecting the exhaust chamber with the supply tank, valves to said tank and pipes leading therefrom back to the chamber inclosing the bookstand and nozzle vents to said pipes.

46. An apparatus for disinfecting books, comprising a compartment case inclosing a revoluble book-stand within a chamber adapted to receive books and provided with a supply for compressed gas and air from nozzle-vented supply pipes connecting with a supply tank for air, a pneumatic exhaust pump operable to force the exhausted gas or air from said chamber back to the supply tank and thence through the said nozzles.

5 In testimony whereof we have signed this specification and hereunto set our signatures in the presence of the two witnesses named, this the 9th day of March A. D. 1912.

SAMUEL JAMES FISHER.
CHARLES EARL JOHNSON JONES.

Witnesses:
W. G. FORTUNE,
GILMER WELCH.